M. B. RIGGS.
POTATO-DIGGER.
No. 184,480. Patented Nov. 21, 1876.
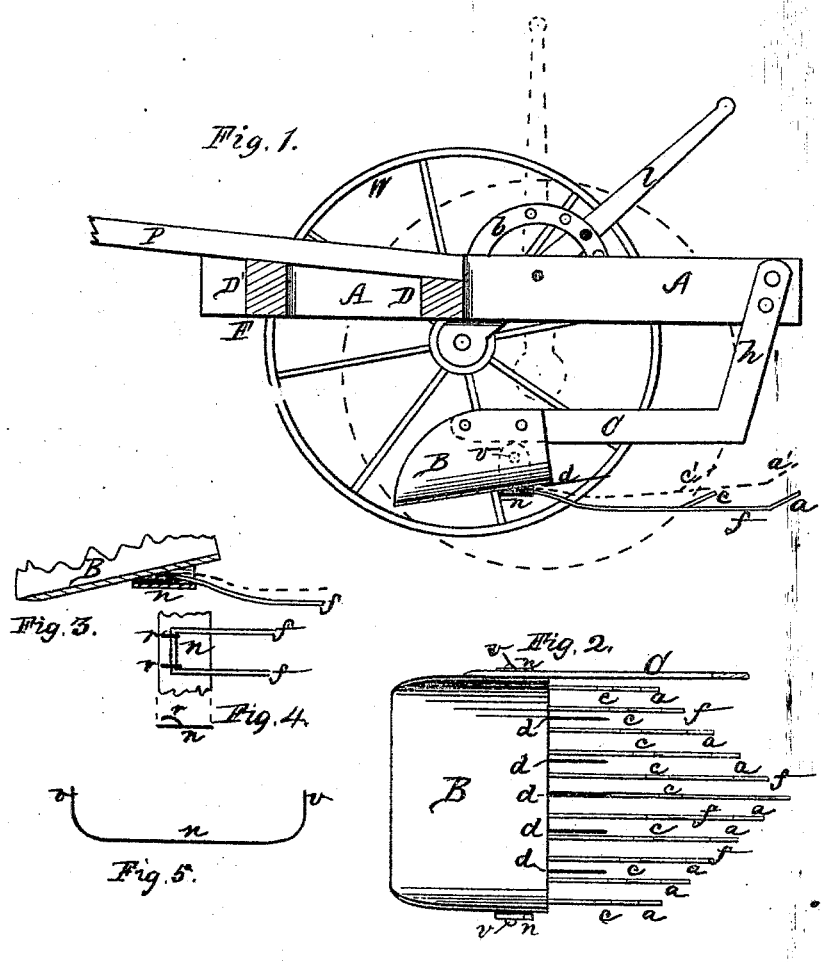

UNITED STATES PATENT OFFICE.

MILES B. RIGGS, OF PALMYRA, ASSIGNOR TO WARNER B. RIGGS, OF MACEDON, NEW YORK.

IMPROVEMENT IN POTATO-DIGGERS.

Specification forming part of Letters Patent No. 184,480, dated November 21, 1876; application filed May 8, 1876.

*To all whom it may concern:*

Be it known that I, MILES B. RIGGS, of Palmyra, in the county of Wayne and State of New York, have invented certain new and useful Improvements in Potato-Diggers; and I do hereby declare that the following is a full, clear, and exact description thereof, reference being had to the accompanying drawings, making part of this specification, in which—

Figure 1 is a vertical longitudinal section of my invention. Fig. 2 is a plan view of the shovel-blade B, with a portion of one of its hangers C attached, and also the separator-fingers $f$. Fig. 3 is a vertical sectional view of the shovel-blade B, and the finger-supporting yoke $n$, somewhat enlarged. Fig. 4 is a plan of a portion of the yoke $n$, also enlarged, showing the loops $r$ by which the fingers are attached to the yoke. Fig. 5 is a rear elevation of yoke $n$ without the hooks $r$.

The object of this invention is to prevent, by a peculiar method of hanging the shovel-blade, the possibility of the machine getting clogged by vines or weeds while in operation, and to effect the separation of the tubers from the earth without the introduction into the machine of mechanical movements for that purpose. It consists in suspending the shovel-blade and its separator-fingers from the front end of a horizontal hanger-arm, the rear end of which is turned upward and bolted to the rear end of the side bars of the main frame, and in a peculiar arrangement of the raised agitators upon the separator-fingers.

From several years experiments I have learned that one of the greatest, if not the greatest, difficulty to be overcome in digging potatoes by machinery is the clogging of the machine by vines and weeds. This obstruction was especially noticeable in trying to get the material over the shovel-blade, when that was hung to the main frame; as heretofore, by hangers running vertically, or nearly so, from the wings of the blade to the frame, the vines would lodge against the front edge of the hanger, and many times wholly prevent the passage of the earth or hills over the shovel-blade. Various plans have been devised for cutting the vines as they might accumulate or lodge there, some perhaps, with partial success; but the addition of any such device is objectionable, in that it complicates the machine to that extent. I wholly obviate this objection without increasing the complexity of the implement in the least by suspending the shovel-blade B from the front end of the long horizontal arms C, the rear end of which are turned upward at a sufficient distance to the rear of the shovel-blade to permit the material to pass freely over it, and the entire separation to be effected by the separator-fingers $f$ before any lodgement of vines can occur, and the natural draft of the passage of the material over the separator-fingers will be to cause a discharge of the vines from the arms C between the vertical hangers $h$. The hangers $h$ may be adjustably attached to the rear end of the side bars A of the frame by suitable clamping-bolts. The arms C may be made separately from the hangers $h$ and attached to their lower ends by bolts or screws. The arms may be either riveted or bolted to the vertical wings of the shovel-blade B. The separator-fingers $f$ are formed as shown in Fig. 1, being slightly bent upward or inclined at the rear end, as shown at $a$, and each from the center toward the sides made shorter, as represented in Fig. 2. They are also provided with a branch inclined agitator, $c$, arranged relatively to the end, as shown, those on the central rods or fingers being farther from the rear edge of the shovel-blade. It will be seen that by this means the potatoes will naturally be worked toward the center of the row as the machine moves forward, and therefore be centrally discharged. These fingers $f$ may be formed from small rods and made in pairs, as seen in Fig. 4. They may be rigidly fixed to the hanger-yoke $n$, or loosely connected by hooks $r$ on the upper side of the yoke. The hooks $r$ may be formed by punching a lip from the metal of the yoke near its front edge, leaving the rear end of the hook fast; or the hooks may be riveted to the yoke. The yoke is detachably pivoted to the sides of the shovel-blade at $v$, Figs. 1 and 2. The rear end of each pair of fingers might be thus allowed an independent vertical movement. They are collectively allowed a vertical movement above the position shown in full lines in Figs. 1 and 3, by the swinging of the yoke upon its axis; but they are prevented from dropping below that position by the front edge of the yoke resting against the under side of the shovel-blade and the fingers resting across the rear edge of the yoke. This is necessary when the machine is raised, as in the act of turning around or for transporting. The ground-wheels W are hung to the lower end of the hand-levers $l$, they being pivoted above to the side bars A, and secured in the desired adjustment by means of the graduated segment $b$. The pole P is fixed to the crossbars D and D′, as shown, and the draft would be attached to the under side of the bar D′ at F. The auxiliary fingers $a$ are attached rigidly to the rear edge of the shovel-blade B. These only are used when digging potatoes which adhere to the vines—as in the case of peach-blows, for instance—the yoke $n$ and the fingers $f$ being detached for that purpose by removing the screws $v$.

What I claim as my invention is—

1. As an improvement in potato-diggers, the shovel-blade B, suspended from the front end of the horizontal bar C, the vertical or inclined portion $h$, of which is bolted to the side bars A of the frame, considerably to the rear of the shovel-blade, for the purposes set forth.

2. In combination with the shovel-blade B, and horizontal hanger-bar C, the pivoted or swinging yoke $n$, and fingers $f$, constructed and arranged to operate substantially in the manner and for the purposes set forth.

3. In combination with the separating-fingers $f$, hinged so as to move vertically more or less, and having inclined branches $c$, the auxiliary fingers $d$, and shovel-blade B, substantially as and for the purposes set forth.

MILES B. RIGGS.

Witnesses:
WM. S. LOUGHBOROUGH,
HENRY E. WHITE.